HEINRICH OBERTHÜR
INVENTOR.

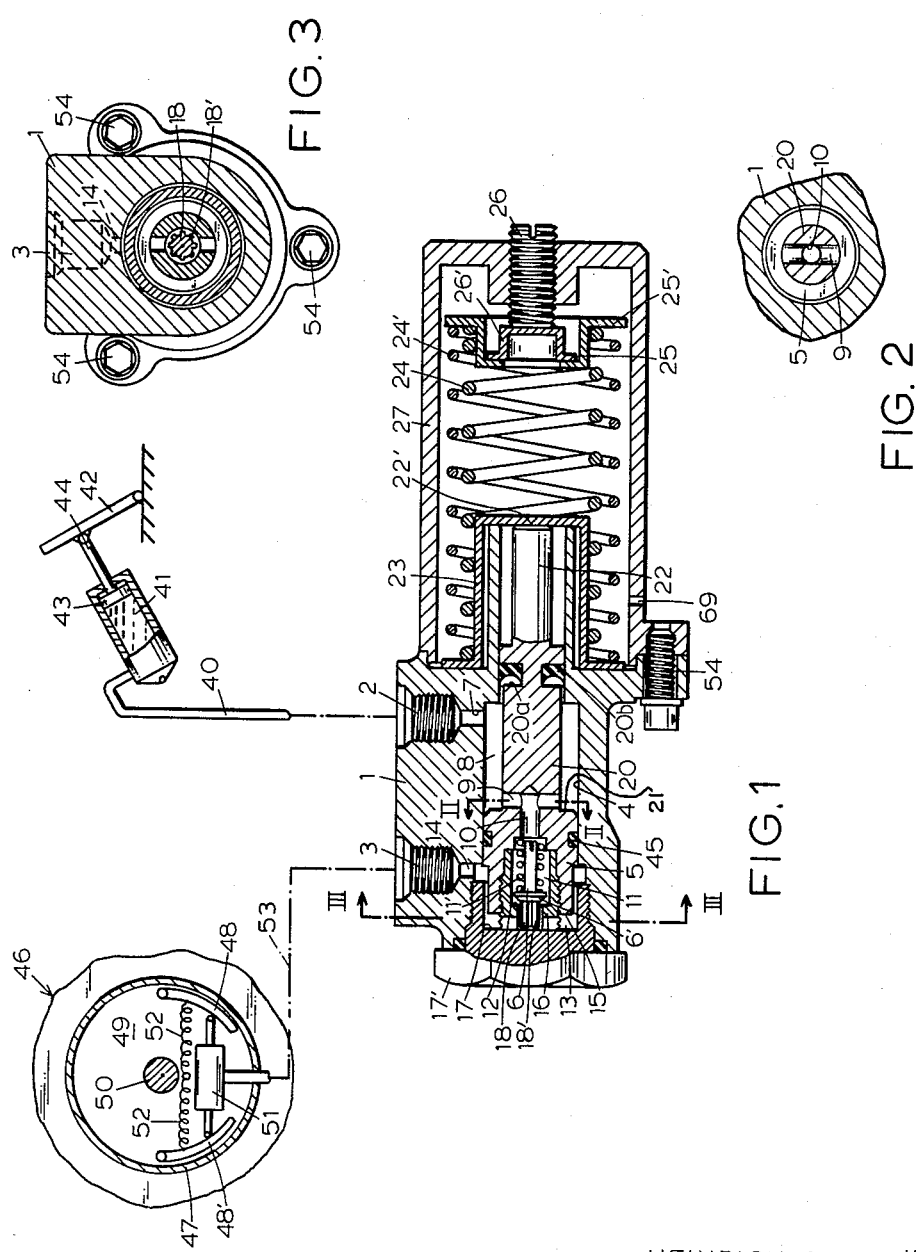

BY
Mestern, Ross & Mestern 3,169,800
BRAKE REGULATOR
Heinrich Oberthür, Offenbach (Main), Germany, assignor to Alfred Teves KG, Frankfurt am Main, Germany, a corporation of Germany
Filed Aug. 17, 1962, Ser. No. 217,609
Claims priority, application Germany, Sept. 16, 1961, T 20,778
10 Claims. (Cl. 303—22)

My present invention relates to a brake regulator and, more particularly, to a device for preventing locking of the brakes of a motor vehicle.

Heretofore braking-force regulators have been known for reducing the force applied to the brake drum or disk of a motor-vehicle wheel upon or just prior to locking of the latter so that skidding or slipping of the wheel is obviated. In the absence of such devices, which are incorporated between the master cylinder and the brake cylinder, the pressure applied to the latter is sustained or progressively increased throughout the braking action so that the wheels of the vehicle often locked at a point at which the vehicle was only moderately slowed. Consequently, the wheels slipped or skidded along the road surface, thereby preventing control of the vehicle by its operator. Usually, prior-art devices of this type were provided with a differential piston and a check valve each of which was controlled by a respective spring. The forces of both springs required adjustment in order to set the switchover point at which the braking force applied to the wheels was reduced so as to prevent locking. Such devices were not adaptable for manual adjustment or automatic compensation for the load upon the wheels of the vehicle. It will be readily apparent that the load on the wheels of the vehicle frequently determines the point at which slippage of the wheels will occur and, particularly for heavily laden vehicles such as trucks, must be taken into consideration in determining the aforementioned switchover point.

It is an object of the present invention to provide an adjustable braking-force regulator for controlling the pressure applied to a brake cylinder. Another object of the invention is to provide a regulator of the character described in which the switchover point is continuously adjustable in accordance with the load upon the wheels of the vehicle.

These objects are attained, in accordance with the invention, in a brake regulator connected between the master cylinder and the brake cylinder which comprises a differential piston reciprocable against the adjustable force of means such as a restoring spring. This differential piston is provided with a first effective surface of relatively small area and a second effective surface of relatively large area and directed oppositely to the first surface. The piston is provided with a passage communicating between first and second fluid chambers in which these surfaces are disposed. A valve means is provided in this passage and co-operates with stationary abutment means for unblocking the passage in a first extreme position of the piston. Upon displacement of the latter against the force of the restoring spring out of the first position, the abutment means is disengaged and the valve closed. Hydraulic fluid is forced, upon actuation of the brake pedal, into the first fluid chamber whence it passes into the second chamber via the passage and then into the brake cylinder. As the pressure in the two chambers rises substantially uniformly, the piston is forced by the differential effect of the two surfaces in a direction opposite the restoring force of the spring or spring means until the valve closes. Further application of force to the brake pedal increases the hydraulic force in the first chamber so that the brake cylinder is charged with fluid under reduced pressure as a consequence of the larger area of the corresponding surface of the differential piston.

Advantageously, means are provided for adjusting the aforementioned restoring force. In a motor vehicle having a substantially constant load, this adjusting means may include a manually displaceable member for preloading the restoring spring. In cases wherein the load varies substantially, I prefer to provide means for automatically adjusting the restoring force in response to the load. Such automatic means may, for example, include a pneumatic chamber, having another piston coupled with the aforementioned differential piston, whose pressure varies in accordance with the magnitude of the load. Thus the resilient fluid cushion of the pneumatic cylinder may be coupled with fluid-type suspension means disposed between the load and the vehicle chassis. Other servo devices may, of course, also be employed to load the gas-filled chamber or restoring spring. Since the valve means is controlled by the abutment means, the point at which it closes is determined only by the force of the restoring means bearing upon the differential piston so that the switchover point can be controlled merely by adjusting this restoring force.

The above and other objects, features and advantages of the present invention will become more readily apparent from the following description, reference being made to the accompanying drawing in which:

FIG. 1 is an axial cross-sectional view of a brake regulator, according to the invention, with the remaining parts of the brake system shown only diagrammatically;

FIG. 2 is a cross-sectional view taken along line II—II of FIG. 1;

FIG. 3 is a cross-sectional view taken along line III—III of FIG. 2; and

Figure 4:
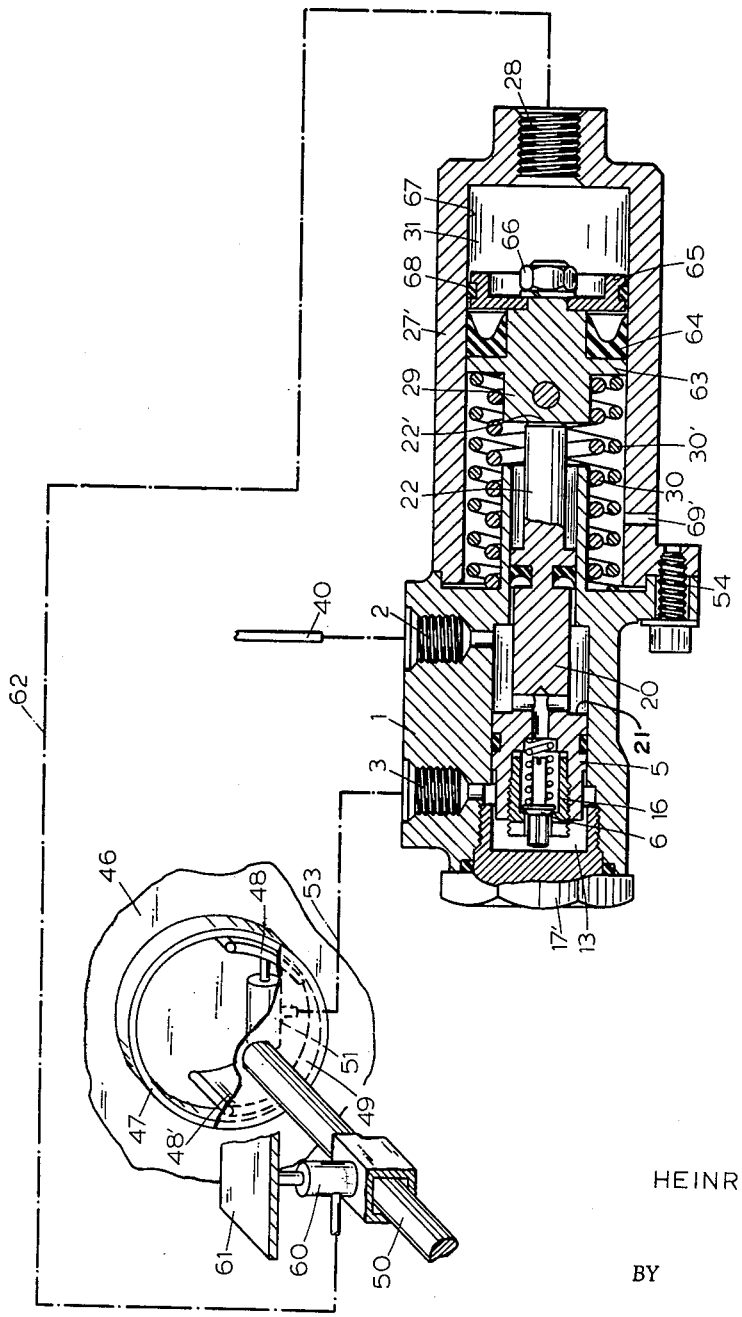
FIG. 4 is a view similar to FIG. 1 illustrating a regulator according to another embodiment of the invention.

In FIGS. 1–3 I show a brake-regulator body 1 which is provided with an inlet 2 for the brake fluid. This inlet is connected via a hydraulic transmission line 40 to a master cylinder 41 shown schematically in FIG. 1. A brake pedal 42 is pivotally mounted on the motor vehicle and is swivelably connected to the piston 43 of the master cylinder via a rod 44. The master cylinder is also pivoted to the vehicle at its extremity opposite the pedal 42. Fluid inlet 2 communicates with a central chamber 8 via a radial bore 7 and receives a differential piston 20 whose head 5 has a sealing ring 45 set in a circumferential groove formed in the head. Sealing ring 45 bears upon the wall 4 of the chamber 8.

The regulator piston 20 is provided with a radial bore 9, communicating with the chamber 8, which opens into a central bore 10 axially extending within the head 5 and terminating in an axial compartment 11 therein. A cap 16 is threaded into the compartment 11 and forms a valve seat 12 for a valve member 6 axially shiftable in this compartment selectively to block and unblock the passage 9, 10. The valve member 6 is formed with an annular shoulder 6' against which a spring 11' bears to urge the shoulder 6' against the seat 12. Member 6 is also provided with a stud 18 with axially extending peripheral ridges 18' which define between them passages for the hydraulic fluid. Stud 18 extends through the cap 16 into engagement with the juxtaposed surface 17 of a plug 17' whose axial recess defines with the piston 20 a second chamber 13. Surface 17 constitutes abutment means for holding the valve 6 in its open position. From the chamber 13 hydraulic fluid can flow via a radial bore 14 and an outlet 3 to the brakes for the wheels of the vehicle. Only a single wheel 46 is shown although it should be noted that both of the rear-wheel brakes of the vehicle may be connected in parallel with the outlet 3 and that even the front-wheel brakes may be coupled with the brake system by connecting their transmission lines at the outlet 3 in a manner known per se.

The brake shown diagrammatically in FIG. 1 comprises a brake drum 47 against which a pair of brake shoes 48, 48', which are pivotally connected to a disk 49 on the axle 50, may be urged by a brake cylinder 51. Springs 52 tend to draw the shoes 48, 48' out of engagement with the brake drum 47. A transmission line 53 connects the brake cylinder 51 with the regulator at its outlet 3. Piston 20 is provided with a further circumferential groove 20a, in which a flange-type seal 20b is received for preventing escape of the hydraulic fluid. Rearwardly of this seal, the piston is provided with a stem 22 which extends axially outwardly of the body 1 and has an end surface 22' against which the restoring force of adjustable spring means is applied.

In the embodiment shown in FIGS. 1–3, this spring means comprises a tubular casing 27 which is removably mounted on the rear end of body 1 by bolts 54 and a pair of springs 24, 24' coaxially received within this casing. These springs bear against the annular flange 25' of a bearing plate 25 and another bearing plate 23 interposed between the springs and the end surface 22' of stem 22. An adjustment screw 26 extends axially outwardly from the casing 27 and engages a member 26' which in turn rests against plate 25.

Prior to initiation of braking action, the differential piston 20 is in the position shown in FIG. 1, i.e. biased to the left by the springs 24, 24' whereby the valve 6 is held open against the abutment 17. When it is desired to initiate the braking action, the brake pedal 42 is depressed to force fluid from the master cylinder 41 via transmission line 40 into the first regulator chamber 8. Since valve 6 is open, the fluid passes via bores 9 and 10 into the piston compartment 11 and thence outwardly past valve seat 12 through grooves 16' in the front face of cap 16 into the second chamber 13. The pressure of fluid is thus transmitted via line 53 to the brake cylinder 51 whose pistons urge the brake shoes 48, 48' into engagement with the brake drum 47 against the force of the springs 52. Since the annular surface 21 of the piston head 5 within chamber 8 has an area $A_1$, which is less than that of the oppositely facing surface 15 of the head, the piston 20 begins to move toward the right against the force of the springs 24, 24'. The area $A_2$ ascribed for convenience to surface 15 is, of course, the area of all surfaces acting toward the right (i.e. against the force of springs 24, 24') while the area $A_1$ is the total area of all surfaces effective in the opposite direction. By virtue of the differential action, piston 20 progressively compresses the springs 24, 24' and draws the valve seat 12 toward the shoulder 6' of the valve 6. While the valve is open, it may be assumed that the pressure within the chambers 8 and 13 is equal and increases uniformly so that $(P \times A_2) - (P \times A_1)$ defines the hydraulic force F effective to displace the piston to the right. This displacement continues only until the force F equals the force $F_s$ of the spring. Simultaneously, brake cylinder 51 is charged with hydraulic fluid at pressure P so that braking action is initiated.

Additional force applied to the brake pedal 42 results in the displacement of the piston 20 sufficiently to close the valve, i.e. to bring the valve seat 12 into engagement with the shoulder 6'. Since the valve is now closed, further displacement of the piston 20 in response to application of additional pressure to the fluid in the master cylinder 41 cannot result in any substantial additional displacement of the piston. The application of such additional pressure, however, requires that the forces applied to the piston by the springs 24, 24' and the fluid in chamber 8 be substantially equal to the opposing force derived from the pressure of the fluid in chamber 13. Consequently, $F_s + F_1 = F_2$ where $F_1$ is the hydraulic force applied to the $A_1$ and $F_2$ is the hydraulic force applied to the surfaces $A_2$. Since forces $F_1$ and $F_2$ are equal, respectively, to $P_1 A_1$ and $P_2 A_2$, it will be evident that any change $\Delta F_1$ in the hydraulic force in chamber 8 will result in a like change in the hydraulic force within chamber 13. Therefore, $\Delta P_1 A_1$ must be substantially equal to $\Delta P_2 A_2$ whence it may be seen that $$\Delta P_1 / \Delta P_2 = A_2 / A_1 \text{ or } \Delta P_1 = A_2 / A_1 \Delta P_2$$

Thus, the pressure in chamber 13 and, indeed, that applied to the brake cylinder 51 is a fraction of that applied to chamber 8, the fraction being determined by the ratio of the areas of the differential piston. The brake pressure $P_2$ at which piston 20 will have been displaced by the hydraulic fluid sufficiently to close the valve is, of course, determined by the restoring force $F_s$ of springs 24, 24'. This restoring force can be adjusted by screw 26 to that of the brake regulator at any desired switchover point.

Upon release of the brake pedal 42 the pressure $P_1$ falls rapidly whereupon the piston 20 entrains the valve to the right under the force $F_2$ of the fluid within chamber 13, the brake shoes 48, 48' being simultaneously relaxed. The piston 20 is displaced to the right only sufficiently so that the force $F_2$ is balanced by the force $F_s$ of the spring, whereupon any additional relaxation of the pressure in the brake cylinder will cause the fluid pressure within chamber 13 to open the valve 6. Piston 20 is then displaced to the left under the force of springs 24, 24', thereby restoring the piston to the position shown in FIG. 1. In FIG. 4 the piston 20 is shown in its extreme right-hand position.

While screw 26 may serve for manual adjustment of the restoring means 24, 24', it must be noted that these adjusting means can set the regulator only to a selected one of a plurality of switchover points. Any change in the load on the vehicle requires resetting of the screw to adjust the switchover point accordingly. In FIG. 4 I show an automatic mechanism for adjusting the restoring force to set the switchover point in accordance with the load on the vehicle wheels. In this embodiment, the casing 27 is replaced by another casing 27' which is formed with an inlet 28 for fluid from the suspension system of the vehicle. This suspension system is schematically illustrated as including a pneumatic shock-absorber or buffer 60 which is interposed between the load-carrying portion 61 of the vehicle and the axle 50 thereof. The shock-absorber 60 constitutes a servomotor which drives the servofollower constituted by a piston 29 which is reciprocable within the casing 27'. The latter is provided with a compartment 31 for a compressible fluid such as air which is coupled with the shock-absorber 60 by a transmission line 62 so that an increase in the load results in compression of the fluid within compartment 31 and, consequently, preloading of this restoring means. Piston 29 bears upon the rear surface 22' of the stem 22 of the first piston and is provided with an annular flange 63 against which a flanged seal 64 rests. A head 65 is secured to piston 29 by a nut 66 and is closely fitted to the inner wall 67 of the casing by a seal 68. A pair of coaxial coil springs 30, 30' bear upon flange 63 for urging piston 29 to the right and for maintaining pressure within compartment 31. Breathing holes 69, 69' are provided in the casings 27, 27' to prevent pneumatic retardation of the operation of the springs 24, 24' and 30, 30'.

The regulator of FIG. 4 operates in a manner identical to that of FIG. 1 with the exception that displacement of the regulator piston 20 to the right is retarded by the restoring force $F_s$ of the pneumatic cushion within compartment 31. This restoring force is variable and depends, of course, upon the pressure within the shock-absorber 60 and, consequently, the load so that the switchover point is directly determined by the latter.

The invention as described and illustrated is believed to admit of many modifications within the ability of persons skilled in the art, all such modifications being deemed

I claim:

1. A brake regulator interposable between a master cylinder and a brake cylinder of a motor vehicle, said regulator comprising a body having a longitudinally extending stepped bore, a casing secured to said housing and forming an elongated first chamber communicating with said bore, a complementarily stepped differential piston reciprocable within said bore and subdividing the latter into a second chamber and a third chamber, said piston having an end face extending into said first chamber, conduit means connecting said second chamber with said master cylinder and said third chamber with said brake cylinder, said piston being formed with a passage interconnecting second and third chambers, valve means in said passage for selectively opening and blocking same, said valve means including a valve member displaceably mounted in said piston, abutment means engageable with said valve member in an extreme position of said piston for retaining said valve means in an open position, and adjustable restoring means in said first chamber resiliently urging said piston into said extreme position, said piston having an annular shoulder exposed to fluid pressure in said second chamber for applying a force to said piston in aiding relationship with the variable force of said restoring means and a surface having an area greater than that of said shoulder exposed to fluid pressure in said third chamber for applying a force to said piston opposite the force of said restoring means.

2. A regulator according to claim 1, further comprising continuously adjustable means for regulating the force of said restoring means.

3. A regulator according to claim 2 wherein said restoring means comprises a spring bearing upon said end face of said piston, said adjusting means including screw means engaging said spring for compressing same.

4. A regulator according to claim 2 wherein said adjustable means comprises means coupled with said chassis for loading said restoring means in response to the load upon said chassis.

5. A regulator according to claim 4 wherein said vehicle is provided with a fluid-suspension means on said chassis supporting said load, said restoring means including fluid-reponsive follower means operatively connected to said fluid suspension means.

6. A regulator according to claim 1 wherein said vehicle comprises a chassis and is provided with a fluid-suspension means on said chassis, said adjusting means includes a piston reciprocable within said first chamber and engageable with said end face of said first-mentioned piston, said chamber being adapted to receive therewithin a resiliently compressible fluid and being coupled with said fluid-suspension means.

7. A regulator according to claim 6 further comprising a spring bearing upon said other piston in a sense tending to compress fluid within said compartment.

8. A regulator according to claim 1 wherein said abutment means comprises a transverse wall of said body, said piston being reciprocable toward and away from said wall, said restoring means urging said piston toward said wall, said valve member being provided with a stud engageable with said wall and an annular shoulder extending generally transversely of said stud; said piston being formed with a valve seat engageable with said shoulder, said valve means further including spring means urging said shoulder towards said set.

9. In a brake system for a motor vehicle having a chassis and wheels mounted on said chassis, in combination, a master cylinder actuatable by the operator of said vehicle; a brake cylinder associated with at least one of said wheels; a regulator interposed between said cylinders, said regulator comprising a body having a longitudinally extending stepped bore, a complementarily stepped differential piston reciprocable within said bore and subdividing the latter into a first chamber and a second chamber, conduit means connecting said first chamber with said master cylinder and said second chamber with said brake cylinder, said piston being formed with a passage interconnecting said chambers; valve means in said passage for selectively opening and blocking same and regulating the flow of said fluid therethrough, said valve means including a valve member displaceably mounted in said piston, abutment means engageable with said valve member in an extreme position of said piston for retaining said valve means in an open position, and restoring means resiliently urging said piston into said extreme position, said piston having an annular shoulder exposed to fluid pressure in said first chamber for applying a force to said piston in aiding relationship with the the force of said restoring means and a surface having an area greater than that of said shoulder and exposed to fluid pressure in said second chamber for applying a force to said piston opposite the force of said restoring means; and fluid suspension means on said chassis for supporting a load, said suspension means being coupled with said restoring means for adjusting the force thereof in response to the magnitude of said load, said restoring means including a pneumatic cylinder secured to said body, another piston subdividing said cylinder into a third and a fourth chamber and reciprocable within said cylinder, said first-mentioned piston having an end face adapted to extend into said cylinder and being engageable with said other piston, said cylinder being formed with a compartment aligned with said bore of said body and coupled with said fluid-suspension means for receiving resiliently compressible fluid therefrom; and means for sealing said cylinder from said bore against leakage of the relative fluids.

10. A brake regulator interposable between a master cylinder and a brake cylinder of a motor vehicle, said regulator comprising a body having a longitudinally extending stepped bore, a complementarily stepped differential piston reciprocable within said bore and subdividing the latter into a first chamber and a second chamber rearwardly thereof, said piston having an exposed end face rearwardly of said second chamber, conduit means connecting said first chamber with said master cylinder and said second chamber with said brake cylinder, said piston being formed with a passage interconnecting said first and second chambers, valve means in said passage for selectively opening and blocking same, said valve means including a valve member displaceably mounted in said piston, abutment means engageable with said valve member in an extreme position of said piston for retaining said valve means in an open position, and adjustable restoring means bearing at said exposed end face and resiliently urging said piston into said extreme position, said piston having an annular shoulder exposed to fluid pressure in said first chamber for applying a force to said piston in aiding relationship with the variable force of said restoring means and a surface having an area greater than that of said shoulder exposed to fluid pressure in said second chamber for applying a force to said piston opposite the force of said restoring means.

References Cited by the Examiner

UNITED STATES PATENTS

| 962,517 | 6/10 | McElroy | 303—60 |
| 976,000 | 11/10 | Schenck | 303—22 |
| 2,150,576 | 3/39 | Bell | 303—22 |
| 2,702,561 | 2/55 | Geffroy | 137—505.42 |
| 2,750,952 | 6/56 | Best et al. | 137—505 X |
| 2,919,161 | 12/59 | Hammer | 303—22 X |
| 2,991,797 | 7/61 | Baldwin | 303—6 X |

FOREIGN PATENTS 23,496 12/11 Norway.

ARTHUR L. LA POINT, Primary Examiner.

EUGENE G. BOTZ, Examiner.